Sept. 28, 1937. C. G. T. SALENIUS 2,094,304
SHOCK ABSORBER
Filed May 13, 1936 2 Sheets-Sheet 2
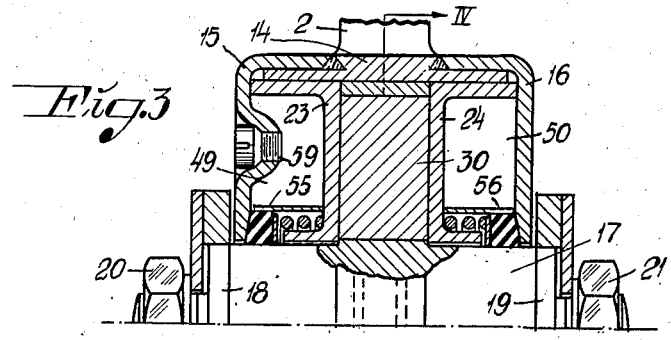
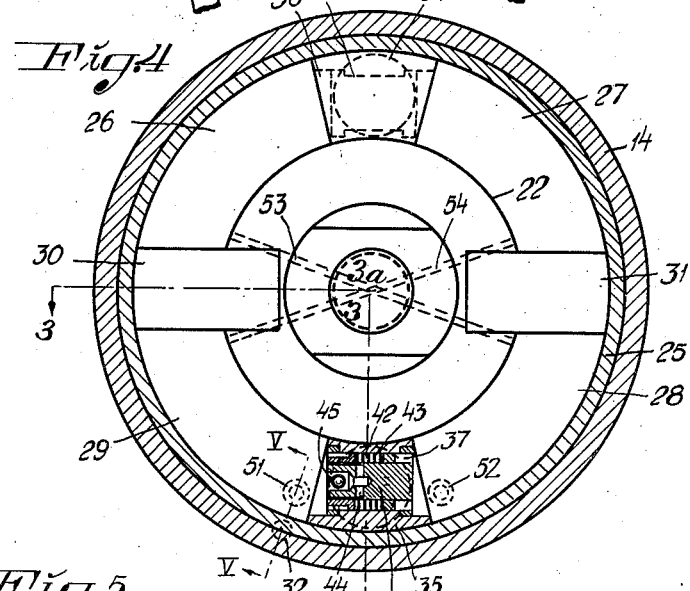
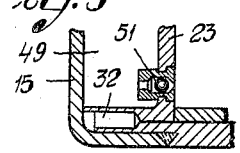
Inventor
Carl G. T. Salenius
By Cushman, Darby, & Cushman
Attorneys Patented Sept. 28, 1937

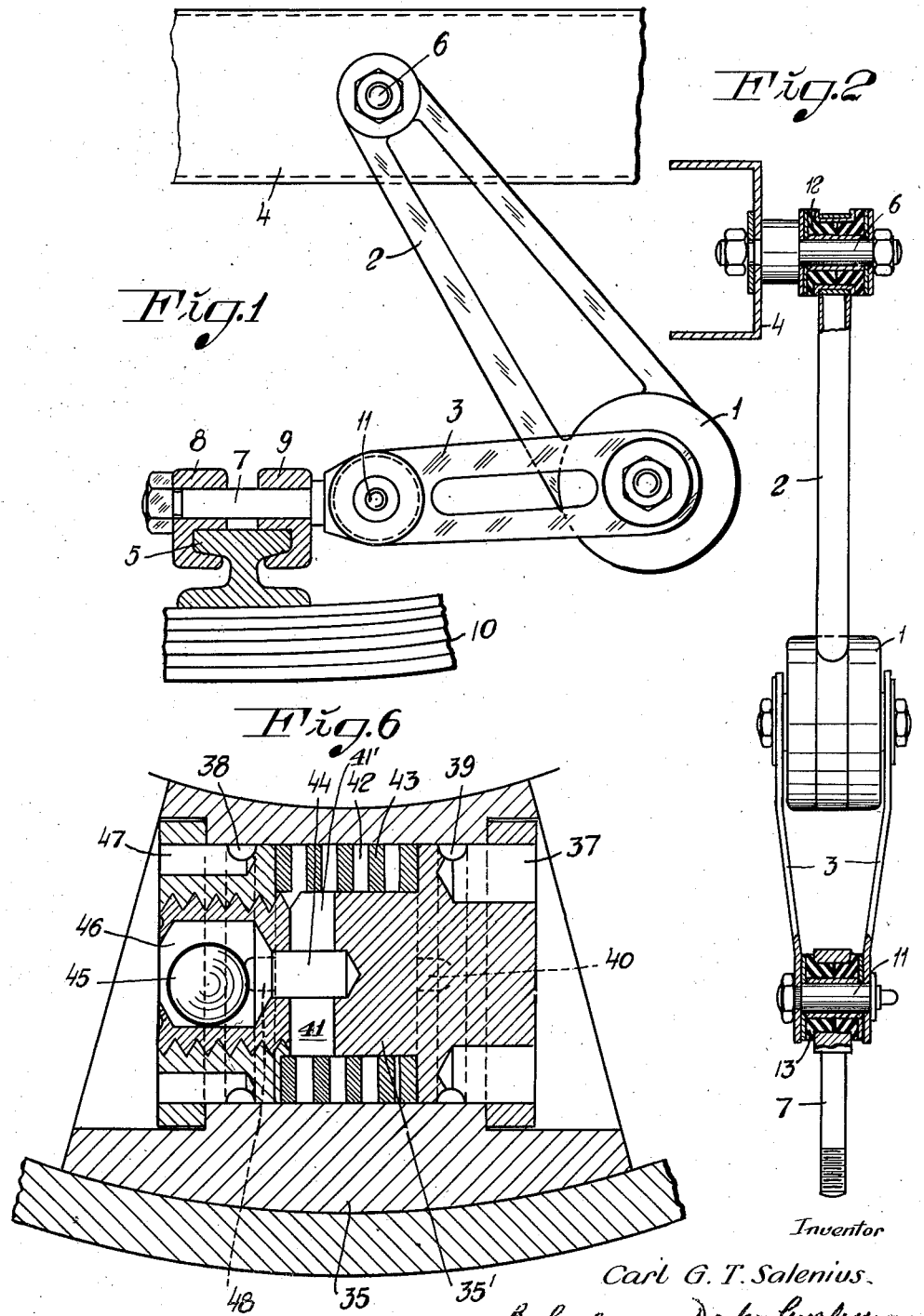

2,094,304

UNITED STATES PATENT OFFICE 2,094,304

SHOCK ABSORBER

Carl Gustav Thorbjörn Salenius, Stockholm, Sweden, assignor to Aktiebolaget Master-Regulator, Stockholm, Sweden, a corporation of Sweden Application May 13, 1936, Serial No. 79,563, In Sweden May 15, 1935

4 Claims. (Cl. 188—89)

The present invention relates to shock absorbers, more particularly intended for vehicles, of the type in which one or more partition or piston members provided between a casing and a rotor member form working chambers filled with liquid and in which said partition or piston members are adapted, when moving relatively to each other due to a shock or oscillations of the axle of the vehicle, to force working liquid from a working chamber into another one, means being provided to restrict the flow of liquid between the working chambers so as to obtain the desired shock absorbing effect.

In shock absorbers of the type described, the compression of the working liquid produces considerable liquid pressures amounting up to several thousand pounds per sq. in. The invention has for its general object to provide a construction of shock absorber in which the different parts are so arranged relatively to each other as to reduce to a minimum the friction between the movable parts.

For a better understanding of the nature of the invention, together with further objects and combination of parts, reference may be had to the accompanying drawings forming a part of this specification and the following description thereof.

In the drawings:—

Fig. 1 is a side elevation of a shock absorber connected to the frame and the axle of a vehicle;

Fig. 2 shows the shock absorber with the arms carrying the same stretched out in a plane;

Fig. 3 shows, on an enlarged scale, a section through the casing of the shock absorber on line III—III of Fig. 4;

Fig. 3a is a sectional view of the shock absorber on line 3a—3a of Fig. 4;

Fig. 4 is a partial section on line IV—IV of Fig. 3;

Fig. 5 is a fragmentary cross-section to a larger scale along the line V—V of Fig. 4; and Fig. 6 shows a detail of Fig. 4 to an enlarged scale.

The shock absorber indicated at 1 is by means of arms 2 and 3 pivotally mounted between the frame 4 of a vehicle and the axle 5 which in known manner is connected to the spring 10. As will be more fully described later on, the arms 2 and 3 are fixed to parts of the shock absorber, which are movable relatively to each other. The arm 2 is mounted on a pin 6 fixed to the frame 4, while the arms 3 form part of a link connection, the other part of which forms a bolt 7 connected to the axle 5 by means of clamps 8 and 9.

The shock absorber is thus not directly connected to any portion of the vehicle, but is freely suspended between the frame and the axle. The pins 6 and 11 carrying the arms 2 and 3 are provided with sleeves 12 and 13 of rubber or the like so that the bearings of the arms will be resilient.

As will be seen from Fig. 3, the arm 2 is formed at its lower end into a cylindrical portion 14 welded together with two symmetrically arranged casing parts 15 and 16. Provided within the casing is a cylindrical member 17 forming a shaft which on both sides is partly cut off as indicated at 18 and 19. The portions 18 and 19 of shaft 17 are disposed near the ends of the casing and may be of polygonal or non-circular cross-section, and have mounted thereon the arms 3. The ends of the arms 3 are provided with holes which correspond to the shape of the cut-off portions of member 17 so that the latter, when inserted into the holes, is hindered from moving relatively to the arms 3. The ends of the cylindrical member 17 are formed into bolts so that the arms 3 may be fixed to the member 17 by means of nuts 20 and 21. The middle portion of the cylinder 17 has a greater diameter than the lateral portions. The radially extending portion 22 is limited, in the axial direction, by means of two C-shaped rings 23 and 24 secured to the casing parts 15 and 16 by means of pins 32 (Fig. 5). Within the space enclosed by the rings 23 and 24 is provided a loose ring 25 which may slide on the inner surface of the cylindrical casing portion 14.

The ring-shaped space enclosed between the cylinder portion 22 and the rings 23, 24, and 25 is, in the manner hereinafter to be described, divided into four separate chambers 26, 27, 28 and 29.

The cylindrical portion 22 of shaft 17 is provided with two recesses into which partition walls 30 and 31 extend so that they will follow the rotary movement of the shaft 17. The walls 30 and 31 are so shaped as to fit the inner surfaces of the rings 23 and 24. The shaft member 17 and the partitions 30 and 31 are supported by the inner surface of the ring 25. It will be seen from Figure 3 that clearances are provided between the inner flanges of the rings 23 and 24 and the shaft 17, so that these flanges will not provide any supporting function relative to the shaft. The rings 23 and 24 are provided with openings adapted to support partition or piston members 35 and 36 by means of bearing members 33 and 34. The pistons are thus compelled to follow the movement of the casing and are so formed as to fit the inner surface of the ring 25 and the outer surface of the cylindrical portion 22.

The pistons 35 and 36 are provided with valves generally indicated at 35' and 36', which permit a restricted flow of liquid between the working chambers. In the present embodiment, the valves are constructed in such a manner that they produce a greater resistance to the flow of liquid in the one direction than in the other one, the resistance being greater when the arms 2 and 3 are moving in such a direction that the angle enclosed between them increases. If the angle between the arms 2 and 3 is decreased, the wall 31 and the piston 35 will be moved relatively toward each other whereby the liquid enclosed in the working chamber 28 will be subjected to a high pressure. Working liquid will then pass from the chamber 28 through openings 37, peripheral grooves 39, and axial passages 40 into an annular space 42 in which is arranged a screw-formed resilient spring 43. The liquid is forced through the channels provided between the coils of the spring and will then flow partly through radial passages 41 and 41' through a central channel 44 and through an outlet opening 46, and partly through axial passages 48, a peripheral groove 38, and openings 47 into the working chamber 29. The outlet 46 is provided with a ball valve 45 which serves as a non-return valve and permits flow of liquid in the direction towards the chamber 29 only. If, due to an opposite movement of the arms 2 and 3, the partition wall 30 and the piston 35 move relatively towards each other, the liquid enclosed in the working chamber will be subjected to a pressure. The ball 45 will then close the outlet 46, and liquid will flow from the chamber 29 through channels 47, the peripheral grooves 38, the axial grooves 48, through the channels between the coils of the spring 43, axial passage 40, the peripheral groove 39, and through the openings 37 into the chamber 28. The passages 47 have a smaller cross-sectional area than the passages 37 so that the flow of liquid from the chamber 29 to the chamber 28 will be restricted to a greater extent than the flow in the opposite direction. The spring 43 controls the resistance exerted by the valve. Upon a violent shock the spring 43, due to the great liquid pressure, is compressed in axial direction and will thereby decrease the cross section of the channels between the coils, while upon less violent shocks the spring will be compressed to a little degree only, thus providing a larger cross section between its coils. The valve 36' in the piston 36 between the working chambers 26 and 27 acts correspondingly with respect to flow of liquid from chamber 26 to chamber 27 or vice versa.

The casing parts 15, 16 and the rings 23, 24 enclose two annular spaces 49 and 50 which may communicate with the working chambers 28 and 29 respectively by means of non-return valves 51 and 52. The chambers 26 and 28 as well as the chambers 27 and 29 communicate with each other through channels 53 and 54 respectively provided in the cylindrical portion 22. The non-return valves 51 and 52 permit flow of liquid only in the direction from the spaces 49 and 50 respectively to the working chambers of the shock absorber. If the pressure within a working chamber falls under the normal value, the non-return valve will be opened and permit flow of liquid from the space 49 or 50 into the working chamber. Upon rise of pressure in the latter, the valve will be closed again. In order to secure a tight closure of the spaces 49 and 50 and to prevent leakage between the casing and the shaft 17, elastic rings 55 and 56 are provided which by means of springs 57 and 58 respectively are pressed against inclined inner surfaces of the casing parts 15 and 16, and thereby also tightens against the shaft 17. The spaces 49 and 50 may be filled or emptied by means of openings 59 and 60 provided in the casing parts 15 and 16 respectively.

The arm 2, the casing parts 14, 15 and 16, the rings 23 and 24, and the pistons 35 and 36 form a unit, the different parts of which are not movable relatively to each other. Likewise, the arms 3, the shaft 17, 22, and the partition members 30 and 31 form a unitary portion of the shock absorber. For the sake of convenience, the part 17, 22 may be termed rotor and the parts 14, 15 and 16 may be called casing, though it will be evident from Fig. 1 that both units are movable.

The arrangement described operates in a manner known per se. If, for example, the arms 2 and 3 move towards each other so that the angle enclosed between them is decreased, the casing and the rotor will turn relatively to each other in such a direction that the partition members 31 and 35 as well as the members 30 and 36 will move towards each other, the movement being damped by the valves 35' and 36'.

Upon movement of the rotor and the casing the partition members 30, 31, 35 and 36 are sliding on the ring 25 which in turn will slide on the inner surface of the casing part 14. The ring 25 thus transmits the movement of the partition member to the whole periphery between the ring and the part 14 so that the friction due to the radial pressures will be distributed along the whole periphery whereby wearing of the surfaces sliding on each other will be reduced correspondingly. Since the ring 25 is freely movable relatively to the partition members as well as to the casing part 14, its movement will be retarded as compared with the movement of the partition members.

The axial pressures due to the compression of the liquid within the working chambers act upon the rings 23 and 24 which are rigidly connected to the casing and arranged symmetrically with respect to the working chambers so that the said pressures will not cause any axial displacement and frictional contact between the casing and the rotor. In connection with the above described operation of the ring 25, this is evidently of great importance with respect to the life and reliability of the shock absorber.

As will be seen from the drawings, the casing, the rotor and the arms connected therewith are arranged symmetrically with respect to a common plane. This results in a simpler and cheaper manufacture of these parts and also protects the bearings from the action of axially directed forces.

The amount of the relative movement between the parts of the shock absorber, due to a certain variation of the distance between the frame and the axle of the vehicle, and the damping effect caused thereby are dependent upon the ratio of the length of the arm 2 to the length of the arms 3. The damping effect will increase, if the arms have different lengths, since in this case a certain variation of the distance between the frame and the axle will cause a greater relative movement of the casing and the rotor, the damping effect being the greater the smaller the length of the short arm is made.

What I claim is:—

1. A hydraulic shock absorber comprising a casing provided with an enclosed liquid chamber, a first partition member fixed to said casing, said casing and said partition member forming a casing system, a shaft extending into said chamber and having a second partition member connected thereto, said shaft and said second partition member forming a rotor system, said partition members dividing said chamber into working chambers and being movable relatively to each other, means in one of said members for providing for restricted flow of liquid from one working chamber into another working chamber, limiting walls secured to one of said systems for limiting said working chambers in axial direction, and bearing means for supporting said rotor system in said casing system, and extending substantially around the whole inner circumference of said casing, said bearing means being rotatable relative to said casing and adapted to limit said working chambers radially outward.

2. A hydraulic shock absorber comprising a casing provided with an enclosed liquid chamber, a first partition member fixed to said casing, said casing and said partition member forming a casing system, a shaft extending into said chamber and having a second partition member connected thereto, said shaft and said second partition member forming a rotor system, said partition members dividing said chamber into working chambers and being movable relatively to each other, means in one of said members for providing for restricted flow of liquid from one working chamber into another working chamber, limiting walls forming part of said casing and adapted to limit said working chambers in axial direction, and bearing means for supporting said rotor system in said casing system, and extending substantially around the whole inner circumference of said casing, said bearing means being rotatable relative to said casing and adapted to limit said working chambers radially outward.

3. A hydraulic shock absorber comprising a casing provided with an enclosed liquid chamber, a first partition member fixed to said casing, said casing and said partition member forming a casing system, a shaft extending into said chamber and having a second partition member connected thereto, said shaft and said second partition member forming a rotor system, said partition members dividing said chamber into working chambers and being movable relatively to each other, means in one of said members for providing for restricted flow of liquid from one working chamber into another working chamber, limiting walls forming part of said casing and adapted to limit said working chambers in axial direction, and a ring member adapted to support said rotor system in said casing system and extending around the whole inner circumference of said casing, said ring member being rotatable relative to said casing and adapted to limit said working chambers radially outwards.

4. A hydraulic shock absorber comprising a casing provided with an enclosed liquid chamber, a first partition member fixed to said casing, said casing and said partition member forming a casing system, a shaft extending into said chamber and having a second partition member connected thereto, said shaft and said second partition member forming a rotor system, said partition members dividing said chamber into working chambers and being movable relatively to each other, means in one of said members for providing for restricted flow of liquid from one working chamber into another working chamber, limiting walls forming part of said casing and adapted to limit said working chambers in axial direction, and a ring member adapted to support said rotor system in said casing system and extending around the whole inner circumference of said casing, said ring member being adapted to limit said working chambers radially outwards and being rotatable relatively to both of said systems.

CARL GUSTAV THORBJÖRN SALENIUS.